United States Patent
Gray

[11] Patent Number: 5,109,761
[45] Date of Patent: May 5, 1992

[54] RAPID BREAD COOLING APPARATUS

[76] Inventor: John B. Gray, 410 Thames St., Morrinsville, New Zealand

[21] Appl. No.: 355,764

[22] Filed: May 23, 1989

[30] Foreign Application Priority Data

May 23, 1988 [NZ] New Zealand .......................... 224759

[51] Int. Cl.⁵ .......................... A21D 6/00; F25B 19/00
[52] U.S. Cl. .......................... 99/517; 62/268; 99/532
[58] Field of Search ............... 99/516, 517, 532, 533, 99/455; 62/268, 100, 70, 69, 62; 426/497, 498, 524, 128, 523, 551

[56] References Cited

U.S. PATENT DOCUMENTS

| | | | |
|---|---|---|---|
| 1,425,143 | 8/1922 | Scheib | 99/532 |
| 1,996,274 | 4/1935 | Burks, Jr. | 62/70 |
| 2,730,149 | 1/1956 | Aguilar et al. | 99/533 |
| 3,237,419 | 3/1966 | Venema | 62/100 |
| 3,296,953 | 1/1967 | Bjorn-Henriksen et al. | 99/533 |
| 3,526,472 | 9/1970 | Remensperger et al. | 99/353 |
| 3,874,189 | 4/1975 | Calim | 62/70 |
| 4,250,714 | 2/1981 | Covy | 62/70 |
| 4,324,107 | 4/1982 | Pipe et al. | 62/268 |
| 4,356,762 | 11/1982 | Langen | 99/533 |

FOREIGN PATENT DOCUMENTS 0131448 1/1985 European Pat. Off. ............... 99/517

Primary Examiner—Timothy F. Simone
Attorney, Agent, or Firm—Foley & Lardner

[57] ABSTRACT

A bread cooling machine comprising at least one carousel mounted for rotation about a central axis and having a number of stations about the periphery of the carousel. The stations are each arranged to support one or more loaves and cooling operations are carried out on the loaves during rotation of the carousel. The means for carrying out these cooling operations comprises hollow needles arranged to penetrate the interior of the loaves and to supply air under pressure thereto to cause a flow of cooling air from the interior of the loaves to the ambient atmospheric pressure exterior. There are conveyor means for delivering loaves to be cooled from an oven for example to the carousel stations and for receiving loaves after the cooling operations from the carousel for further processing stages such as slicing and wrapping of the loaves.

13 Claims, 11 Drawing Sheets

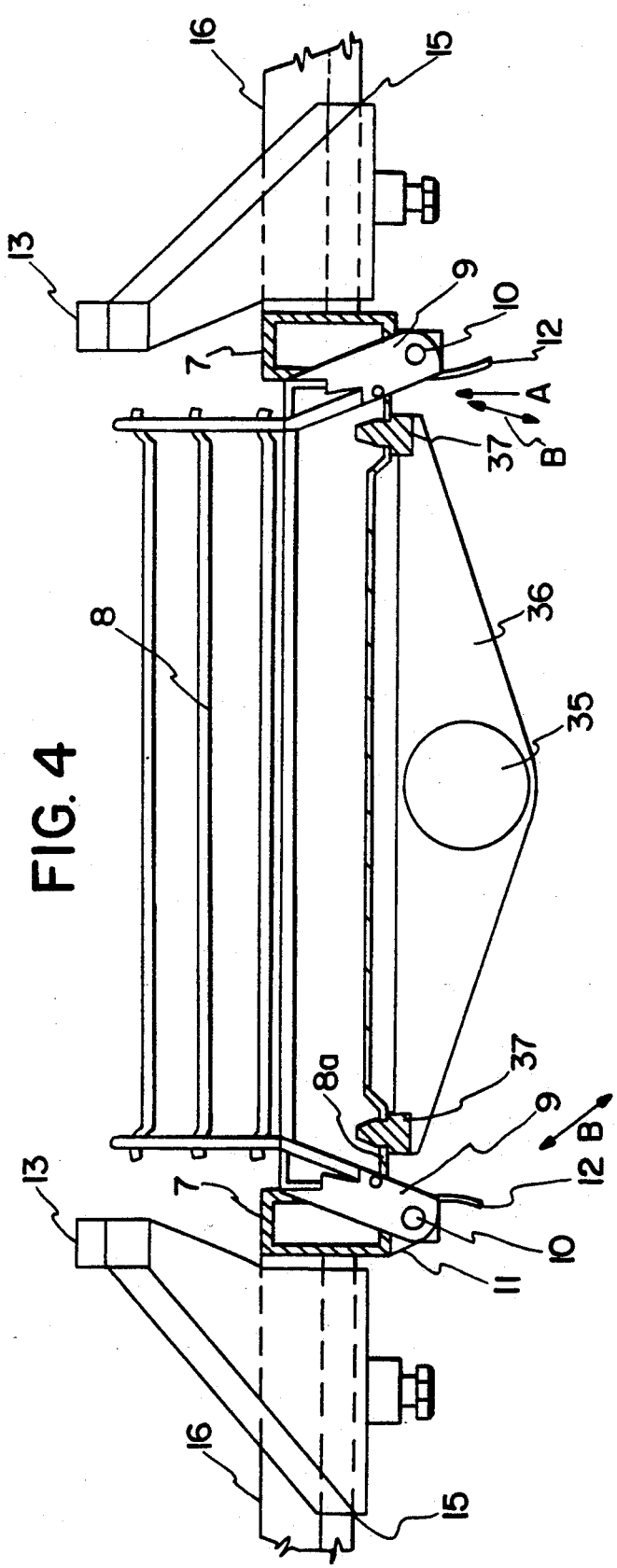
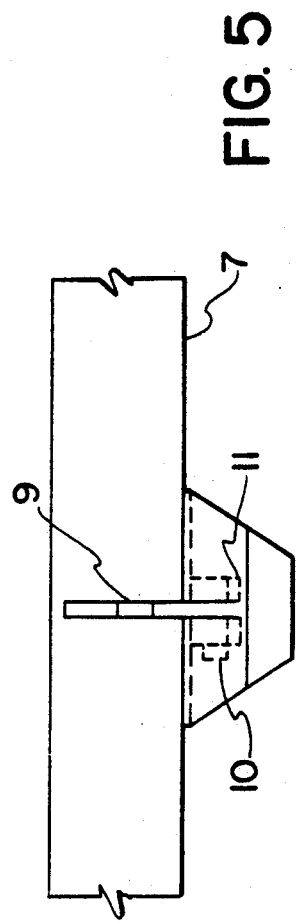

RAPID BREAD COOLING APPARATUS

BACKGROUND

1. Field of the Invention

The invention comprises a machine for cooling blocks of hot porous material and particularly for cooling freshly baked bread after removal from a baking oven.

2. Description of the Related Art

When bread is removed from a baking oven it is necessary for it to be cooled. The hot bread also does not have sufficient strength for any further operations to be carried out, such as slicing and wrapping of the loaves. If the loaves are wrapped for sale when hot or warm the bread deteriorates more rapidly than would otherwise be the case. Typically bread is presently cooled by placing the loaves on racks, either manually or automatically, and blowing cooling air by way of a fan or the like over the loaves. Cooling of bread loaves in this manner is relatively slow, and in addition the relatively large amounts of manual handling of the loaves in moving them from the bakery oven to cooling racks and then to the slicing and wrapping stages is relatively labour intensive, and the storage of the loaves during cooling takes up much floor space. In addition there is scope for improvements in production quality. Specialised automated relatively high speed bread cooling machines and apparatus have been proposed but none has met with widespread commercial acceptance.

SUMMARY OF THE INVENTION

The present invention provides an improved or at least alternative machine and also method for relatively rapidly cooling blocks of hot porous material and particularly freshly baked bread loaves.

In broad terms the invention may be said to comprise a bread cooling machine comprising:

a carousel mounted for rotation about a central axis and adapted to support one or more loaves at a number of stations spaced about the carousel, means associated with the carousel for carrying out cooling operations on the loaves during rotation of the carousel including means for supplying air under pressure to the interior of the loaves to cause a flow of cooling air through the interior of the loaves to the exterior, and conveyor means for delivering the loaves to and receiving the loaves from the carousel.

The invention may further be said to comprise a bread cooling machine comprising:

a carousel mounted for rotation about a central axis and comprising a number of stations about the periphery of the carousel each arranged to support one or more loaves while undergoing cooling operations on the loaves during rotation of the carousel, means for carrying out cooling operations on the loaves at each carousel station comprising hollow needle means arranged to penetrate the interior of the loaves and to supply air under pressure thereto to cause a flow of cooling air from the interior of the loaves to the ambient atmospheric pressure exterior, and conveyor means for delivering loaves to be cooled to the carousel stations sequentially and for receiving loaves after said cooling operations from the carousel stations sequentially.

Preferably the conveyor means is arranged to deliver loaves to the carousel such that as each carousel station passes the conveyor means a number of loaves previously subjected to cooling operations are transferred from the carousel station to the conveyor means and a number of loaves to be cooled are transferred from the conveyor means to the carousel station.

Preferably the machine includes batching means for delivering batches of fixed numbers of loaves to be cooled from a continuous stream of loaves for transfer to the carousel stations. The loaves may be supported at each carousel station on a rack and the batching means may be arranged to place each said batch of loaves onto a said rack and to provide said racks for delivery by the conveyor means for transfer to the carousel.

Preferably the carousel is caused in operation of the machine to rotate with a stepped rotational movement and the conveyor means is caused to move with a similar stepped movement in synchronisation with the carousel such that as each rack of loaves to be cooled carried to the carousel by the conveyor means approaches a conveyor means - carousel transfer location it is transferred while the carousel is stationary to a station of the carousel, and as each rack of cooled loaves on the carousel approaches a carousel - conveyor means transfer location it is transferred while the carousel is stationary to the conveyor means.

The conveyor means arranged to receive the cooled loaves from the carousel and to deliver loaves to be cooled to the carousel may comprise separate delivery and receiving conveyors or may alternatively comprise a single continuous conveyor, a forward run of which carries batches of loaves to be cooled from the batching means to the carousel and a return run of which carries batches of cooled loaves from the carousel.

The invention also comprises a method of cooling bread comprising the step of inserting hollow needle means into the interior of loaves to be cooled and through pressure of air supplied to said hollow needle means causing cooling air to flow from the interior of the loaves to the ambient pressure exterior.

Preferably the method of the invention includes the steps of carrying the loaves of bread at a number of stations about the periphery of a carousel mounted for rotation about a central axis and each arranged to support one or more loaves while undergoing cooling operations on the loaves during rotation of the carousel, and conveying loaves to be cooled to the carousel stations sequentially and receiving the loaves after cooling operations from the stations sequentially.

The flow of cooling air through the loaves is caused by supplying air under pressure to the interior of the loaves by the hollow needle means so that air flows from the interior of the loaves to the outside. The exterior of the loaves is at normal ambient atmospheric air pressure.

The expression 'air' as used in this specification and claims is to be understood as extending to mixtures of air with other gasses which may be utilised with air for cooling or other purposes, or to the use of a cooling gas other than air altogether.

The expressions 'bread' and 'loaves of bread' are to be understood as extending to other products which may be desired to be cooled after baking, for example, such as any baked, yeast raised, cake or pastry product or the like.

The 'conveyor means' will hereinafter be referred to as the 'conditioning conveyor' and the 'batching/racking means' as the 'batching conveyor'.

BRIEF DESCRIPTION OF THE DRAWINGS

A preferred form of machine of the invention is described, by way of example, with reference to the accompanying drawings, wherein:

FIG. 4 is cross-sectional semi-schematic view of a rack support position on the carousel generally along line I—I of FIG. 3, and FIG. 5 is a view of a part of the rack support position indicated at arrow A in FIG. 4, FIGS. 6 and 7 are horizontal and vertical cross-sectional views of the central part of the carousel and the carousel support and rotating union.

DETAILED DESCRIPTION OF THE PREFERRED EMBODIMENT

Figure 1:
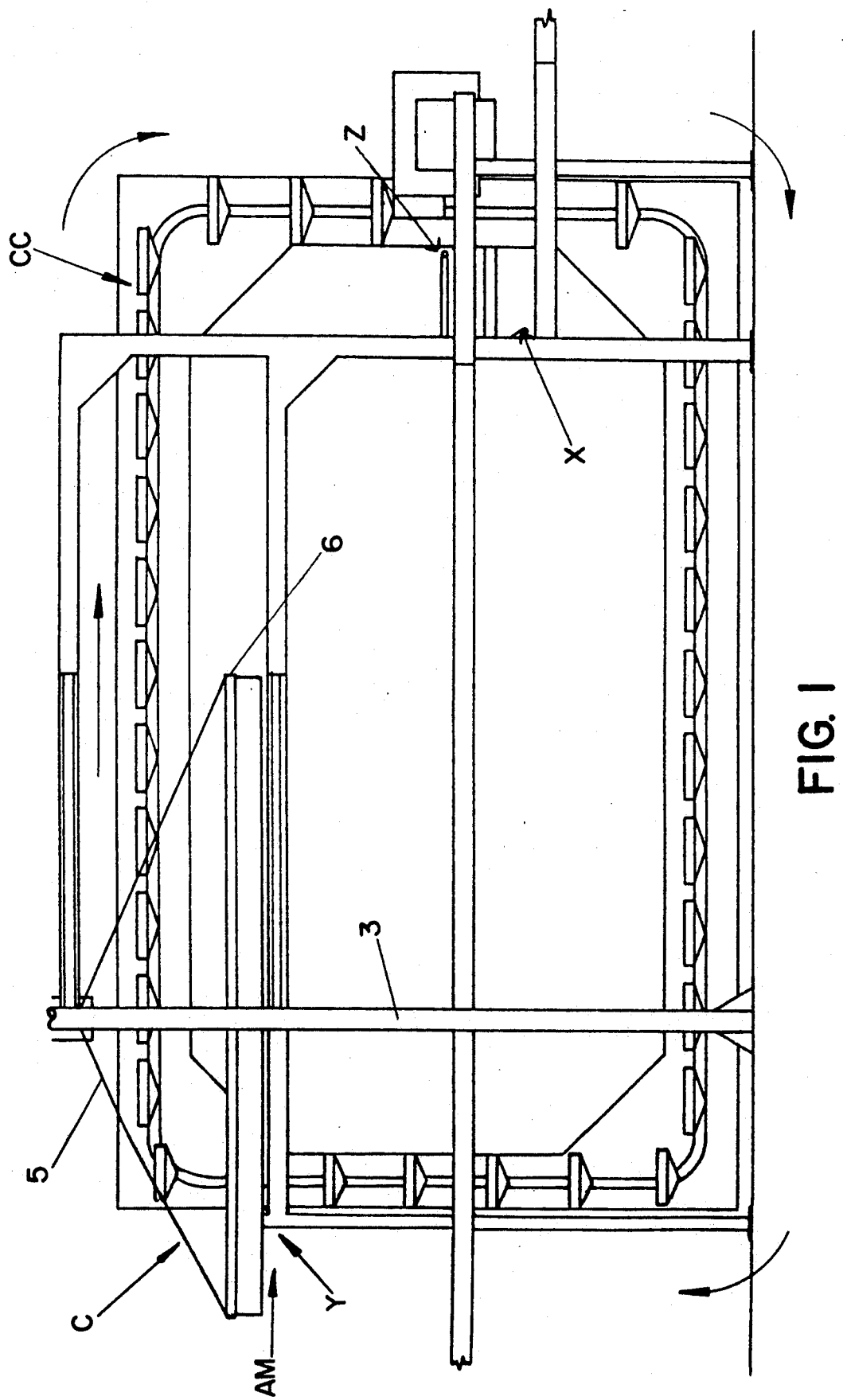
FIG. 1 is a view from one side of the major components of the preferred form machine with the carousel of the preferred form machine shown only in part.
Figure 2:
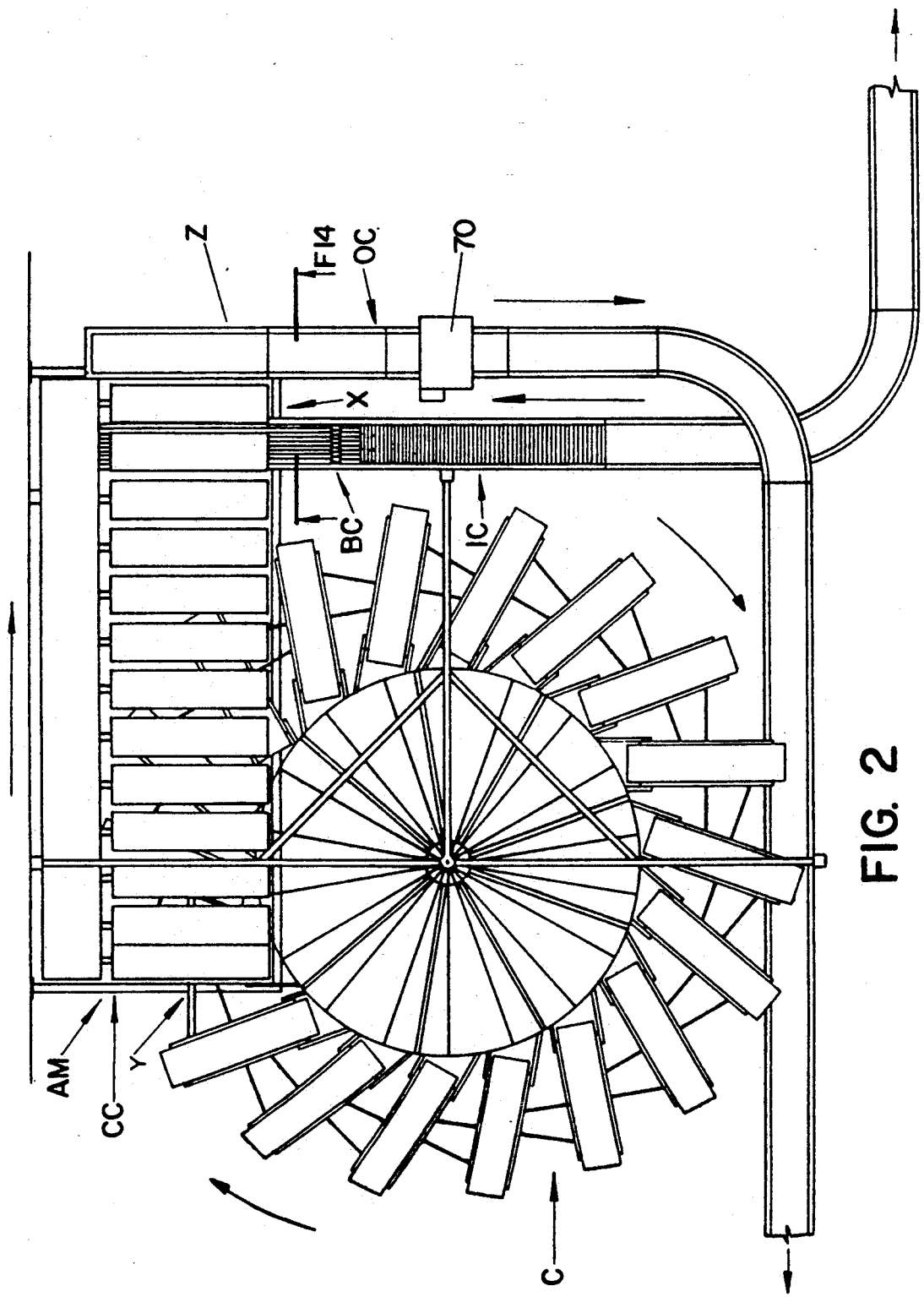
FIG. 2 is a view from above of the major components of the preferred form machine.

In FIGS. 1 and 2 of the drawings the carousel of the preferred form machine is generally indicated at C, and the direction of rotation of the carousel in operation is also shown by arrows. The conditioning conveyor of the preferred form machine is generally indicated at CC and the batching conveyor at BC.

In general operation of the machine the conditioning conveyor CC receives loaves to be cooled from the batching conveyor BC, to which they are fed by an input conveyor IC from an oven or the like, at approximately point X in FIGS. 1 and 2, and moves generally in the direction shown by arrows, to raise the loaves on racks to the carousel where they are placed thereon at point Y from the conditioning conveyor CC. The batching conveyor acts to place the loaves in fixed numbers on racks at point Y for taking up by the conditioning conveyor. While on the carousel the loaves are subjected to cooling operations as will be described. The racks of cooled loaves are after cooling received again onto the conditioning conveyor and on their return run are delivered to be deracked and transferred to an output conveyor OC from the machine, at point Z. Typically the output conveyor would feed the loaves to some further processing stage such as a slicing and wrapping stage or the like.

Figure 3:
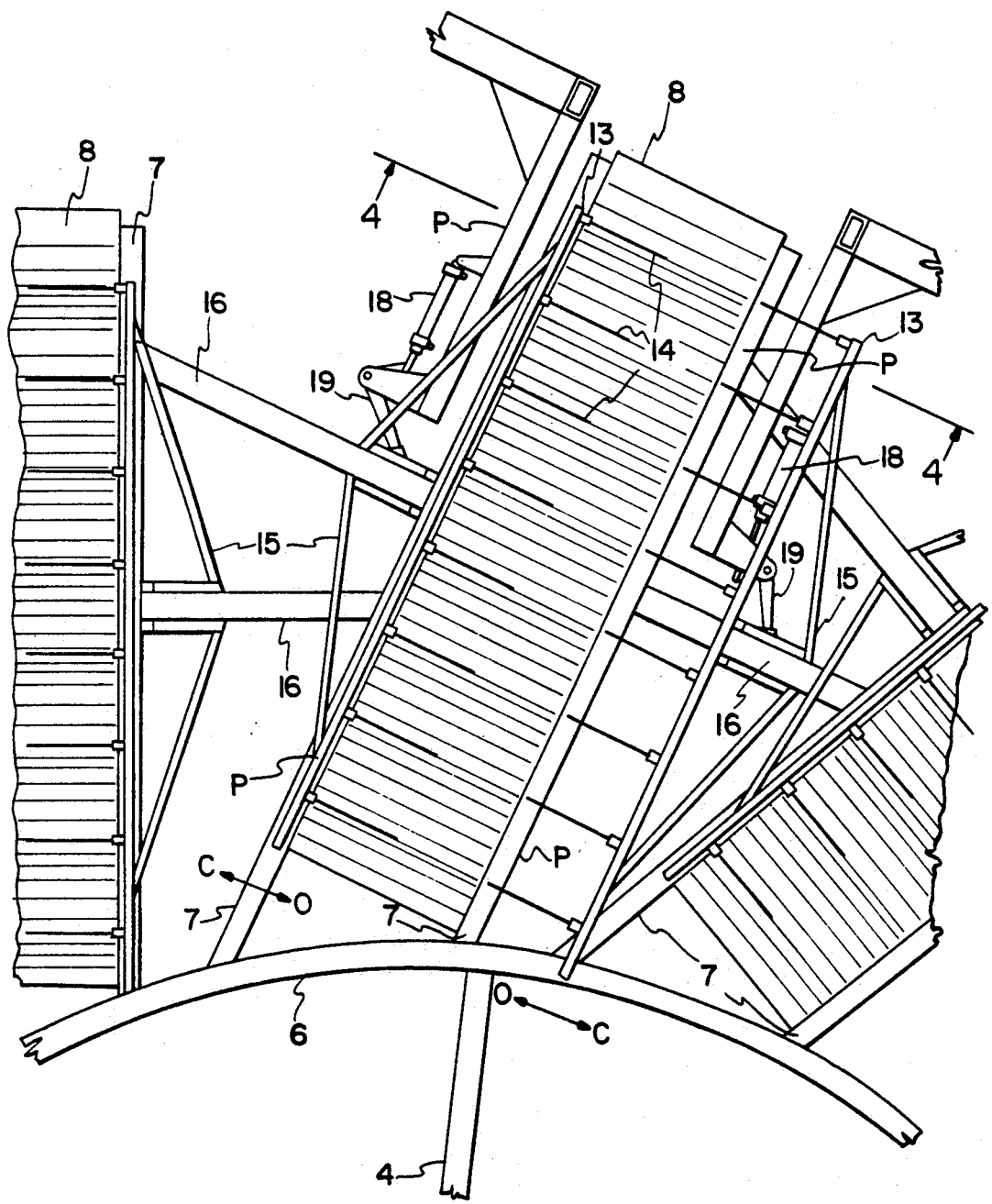
FIG. 3 is a view from above of one rack support position on the carousel.
Figure 7:
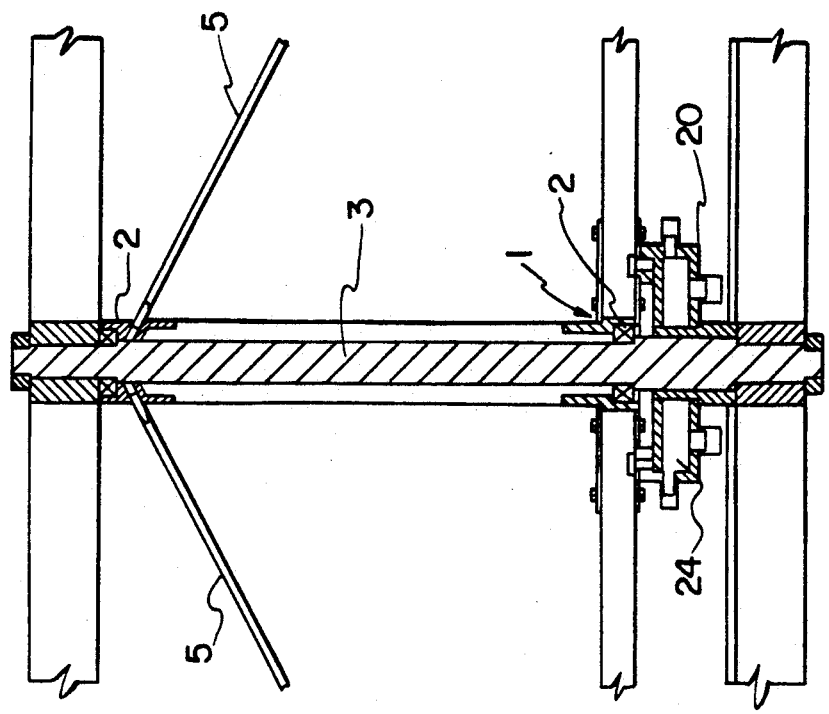
Figure 6:
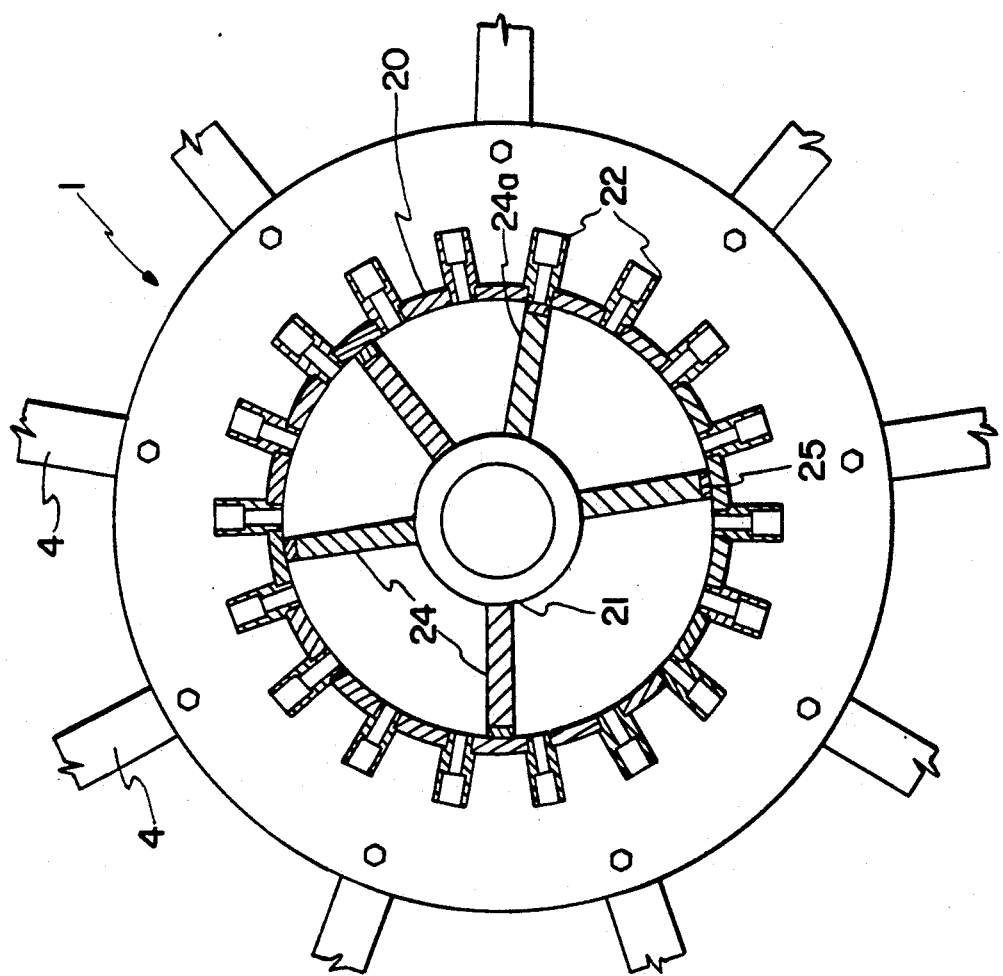

The carousel C is shown generally in plan view in FIG. 2 and is shown in part in FIG. 1, where the individual carousel rack support stations shown in FIG. 2 (and one of which is shown in FIG. 3) are not shown, and central parts of the carousel are shown in horizontal and vertical cross-section in FIGS. 6 and 7. The carousel comprises a central hub generally indicated at 1 mounted by way of suitable bearings 2 for rotation about a central upright 3 of the carousel, and from which radiate spoke-like members, a number of which are indicated at 4, to form the carousel frame. Brace members 5 extend from towards the top of the central upright 3 to the periphery of the carousel frame at the ends of the spoke members 4. The carousel is provided with a suitable drive motor (not shown) controlled by a control system of the machine, to cause the carousel to rotate in steps.

The carousel is in the preferred form adapted to hold a rack of eight loaves at each of a number of carousel stations spaced about the periphery of the carousel, as best shown in FIG. 2. One such carousel station is shown in plan view in FIG. 3. The circular member 6 spans about the outer ends of the spoke members 4 and forms a peripheral frame part of the carousel from which in turn extend two parallel members 7 at each rack support station. The members 7 extend at a tangent at each station as shown. During rotation of the carousel a rack of loaves is supported between the members 7 and one such rack is shown in FIG. 3 at 8, but the members 7 are spaced apart such that the rack may move freely between the two members 7 in a generally vertical direction. Referring to FIG. 4, which is a cross sectional view of one rack support station latching means comprising, pawls 9 shaped generally as shown are provided on each member 7. Each pawl 9 is mounted for pivotal movement as indicated by arrows B in FIG. 4 about a pin 10 in a mounting 11 provided on the underside of its respective member 7, and is biased by a spring 12 towards its normal position shown in the drawings. Two pawls are provided on each member 7 and are spaced apart at positions P in FIG. 3. The pawls 9 are shaped to each engage into correspondingly positioned slots formed in the pressed metal sides 8a of the racks 8 as shown in FIG. 4 where a rack 8 is shown in position, when a rack is supported at same.

For receiving a rack onto a carousel station position, as the conditioning conveyor brings a rack of loaves up between the arms 7 of the carousel station the upper edge of either side 8a of the rack will engage the lower side of each of the pawls 9 causing the pawls to move on either side from their normal position backwardly to 'open up' as the rack rides over the pawls, until the slots formed in the rack sides 8a are level with the pawls when the pawl teeth will engage into the slots to take up and support the rack at which time the conditioning conveyor will reverse approximately 100 mm to leave the tray support arm clear of the carousel. In the preferred form machine shown each pawl 9 comprises two spaced teeth or steps so that the rack may be held at two alternative positions on the carousel, in the upper of which the rack and loaves thereon are held higher on the carousel position than in the lower. The upper position is used for smaller dimension loaves than the lower position which is for larger loaves, and in the upper position the smaller loaves are held higher so that the fixed needles, as will be described, still enter the loaves centrally.

At each station on the carousel is provided means for carrying out cooling operations on the bread loaves. On either side of each station a needle frame member 13 supports a number of needles, some of which are indicated at 14, each having a hollow interior and a number of apertures from the interior of the needle to the outside along their lengths. The apertures through the walls of the needles may be drilled in a helix about the length of each needle, and the distal ends of the needles should be blanked off and not open. Air under moderate pressure is supplied to each needle 13 by way of a plastic pipe (not shown) connected to the base of each needle. The individual air pipes to each needle are in turn connected to a larger pipe connected to a supply of air under pressure as will be referred to further.

The needle frame member 13 is supported by a subsidiary frame 15 which is in turn suitably mounted for sliding movement to frame members 16 which extend between adjacent carousel stations as indicated by arrows, so that the frame 15/needles may move as indicated by arrows C between fully retracted and fully forward positions shown on either side in FIG. 3 at 0 and C respectively. The frame 15/needles 14 unit may be mounted to the members 16 by way of a linear bearing system or the like. The frames 15/needles 14 in operation move in unison and are shown in opposition in the drawing for illustrative purposes. The arrangement is such that when a rack 8 and a number of loaves supported thereon is transferred to a rack support station on the carousel by the conditioning conveyor CC, the frame 15/needles 14 on either side may then be operated to both move to their fully forward positions, so that the needles 14 will be inserted into the loaves from either end. When the carousel next moves/steps so that the rack support station/loaves are moved and the following rack support station of the carousel is moved to receive a rack of loaves as will be described, a flow of cooling air is then initiated to flow from a pressure source as will be described, through the connecting pipes and through each of the needles 14 into the loaves, and from the interior of the loaves to the outside to cool the loaves.

Actuating mechanisms for the frames 15/needles 14 are provided on either side on a fixed part 17 of the machine frame work, comprising a hydraulic or pneumatic cylinder 18 connected to a pivotally mounted lever member 19. One end of each lever member 19 is connected to the rod of the cylinder 18 while the other end comprises an operative part which engages in to a corresponding recess on the frame 15 of the needle frame 15/needles 14 on either side (not shown in the drawings). The arrangement is such that when the cylinders 18 are operated to move to their fully extended position the frame 15/needles 14 on either side are caused to move to their fully retracted positions, and when the cylinders 18 are operated to move to their fully retracted positions the frame 15/needles 14 on either side are caused to move fully forward so that in use the needles will be inserted into the loaves carried on the rack 8, one needle entering each loaf from either end. Only one set of such actuating mechanisms is provided, at a position on fixed part of the machine frame work, at point AM in FIGS. 1 and 2, and the arrangement is such that as the carousel rotates, and each rack support position on the carousel is moved to the point Y, the distal ends of the lever members 19 will enter into engagement with the recesses referred to on the underside of the frame 15 of the carousel position, for insertion and withdrawal of the needles. It is not necessary for the needles to be inserted/withdrawn at any other point. The needles should move in unison during insertion into and withdrawal from the loaves to prevent movement of the loaves on the racks 8 at the carousel stations; it is possible that a suitable arrangement of mechanical restraint to hold the loaves might otherwise be required. The racks may for example have very slight indentations to retain the loaves in position on the racks against lateral movement. Only slight indentations will not prevent the loaves from sliding from the racks when positively pushed by the output pusher bars as will be described.

FIGS. 6 and 7 show a rotating union/central manifold arrangement for providing cooling air under pressure to each manifold 13/needles 14 at each carousel position. In the preferred form apparatus when a rack of loaves is initially received on the carousel and the needles are inserted thereinto, air at a relatively lower pressure is passed through the loaves, and as the carousel rotates the pressure of the air flow passing through the loaves is increased in steps. In the preferred form machine a central manifold comprising rotor part 20 and a stator part 21 is associated with the central hub of the carousel. The rotor part 20 of the central manifold comprises a number of outlets, some of which are indicated at 22, extending radially therefrom as shown, each of which feeds one pair of manifolds 13/needles 14 at a carousel rack support position. The central manifold rotor 20 is fixed to the carousel frame so that it rotates therewith and the stator 21 is fixedly associated with the central upright 3 of the carousel, and comprises a number of radial partition members 24 which extend within the interior of the rotor as shown. Suitable seals 25 are provided at the end of each partition member 24 for contacting the internal end surface of the rotor.

The various volumes between adjacent partition members 24 are supplied with air at different pressures so that as the carousel rotates and the rotor part 20 moves relative to the stator 21, stepped pressures of air will be supplied to each of the outlets 22. In the preferred form shown there are five such volumes and five pressure steps, of, for example, 5, 10, 15, 20, and 25 psi, and the carousel is caused to rotate at a speed of 4.5 mins per revolution so that the flow of cooling air at these pressures is maintained for 48, 80, 48, 32 and 25 seconds respectively. The arrangement is such that when each carousel rack support station is on station for receiving or giving up of a rack of loaves from or to the conditioning conveyor, and when the needles are inserted into or withdrawn from the loaves, the partition member 24a will block off the port 22 for that station, so that no cooling air will flow. When a rack of loaves has been received onto the carousel and the carousel begins to move again the carousel station port will move from the partition 24a so that as the carousel station moves away air will begin to flow as described. It is important that the cooling air is appropriately temperature-controlled and conditioned as will be further described, and it is also possible for a 'fogging nozzle' to be provided in each of, or for example, the last two or any other of the stator volumes to admit a fine mist of moisture to raise the moisture content of the cooling air.

Figure 8:
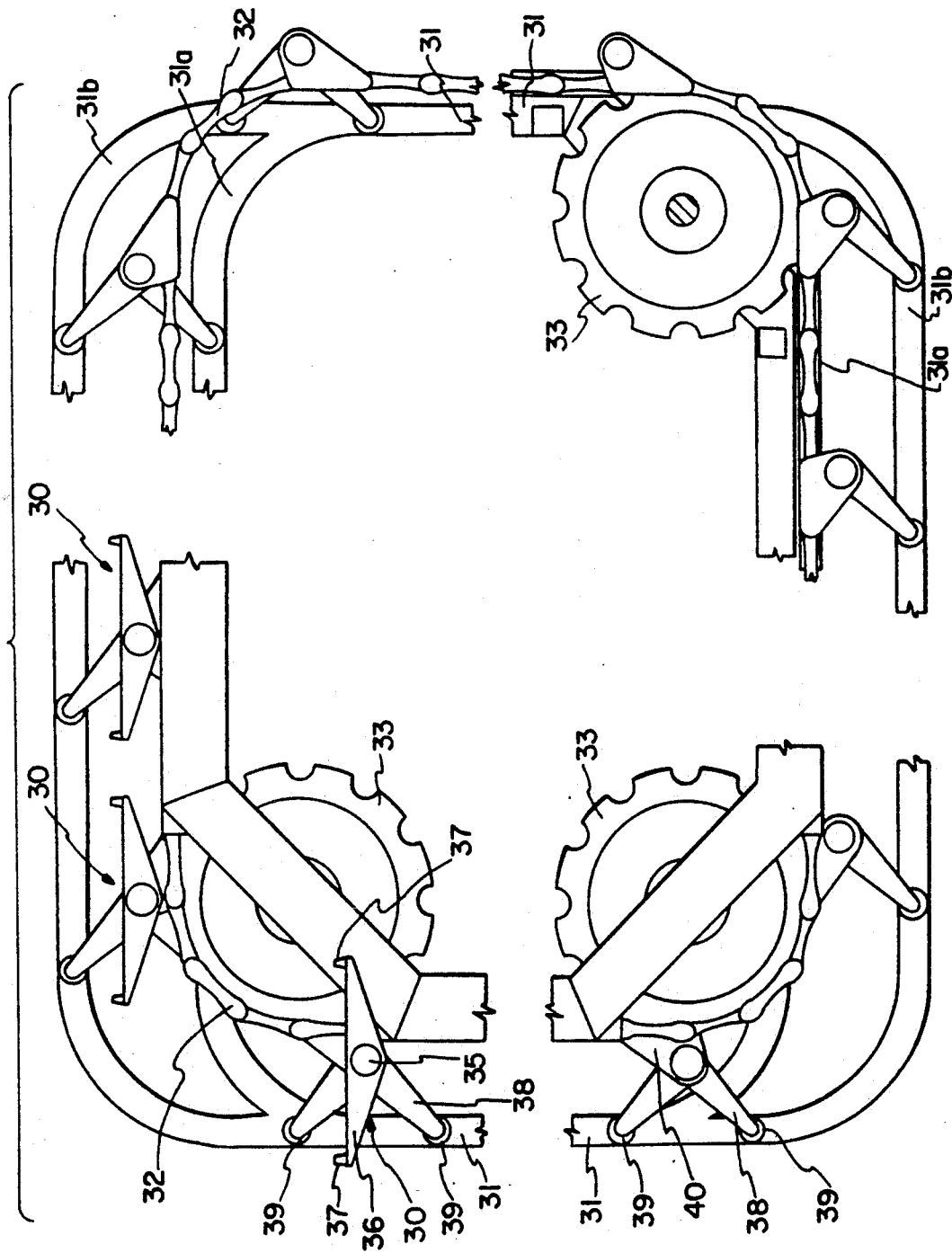
FIG. 8 is a view from one side showing parts of the conditioning conveyor of the preferred form apparatus.

The conditioning conveyor CC shown in FIGS. 1 and 2 is also shown in more detail in FIG. 8. The conditioning conveyor comprises a forward run between point X wherein racked loaves are placed on the conditioning conveyor and point Y wherein racked loaves after cooling are received onto the conditioning conveyor from the carousel, and a return run between the carousel and point Z wherein cooled loaves are delivered from the conditioning conveyor to the output conveyor OC referred to earlier. The conditioning conveyor comprises a number of tray arms generally indicated at 30 each for a rack for carrying loaves such as that indicated at 8 in FIG. 3. Each of the tray arms is mounted at one end to a rail 31 (FIG. 8) of the conditioning conveyor and is connected to a conveyor chain 32. In the arrangement shown in the drawing the horizontal runs of the tracks 31 comprise two parallel tracks 31a and 31b extending between corners while the vertical runs comprise a single track. The conveyor chain 32 passes about drive gears 33 provided at each corner of the conditioning conveyor frame 34 as shown (shown removed at one corner). Each of the tray arms 30 comprises a central stanchion member 35 which extends generally horizontally from the conveyor tracks, and which comprises transverse members 36 at either end provided with nibs 37 adapted to engage a rack to locate same on the tray arm when carrying same; in FIG. 4 the rack 8 is shown supported on a tray arm from below. At its inner end the stanchion 35 is fixedly connected to a bogey arrangement whereby the support frame is supported from the tracks 31, comprising a V shaped bogey member 38 mounting at either end of its two legs a wheel 39 engaged in the conveyor track 31, and a chain connection member 40 whereby the support frame is connected to the conveyor chain 32. The bogey 36 is fixedly connected to the stanchion 35 while the chain connection member 40 is pivotally connected to the stanchion 35 and fixedly connected to the chain 32. The arrangement is such that when any tray arm is traversing a horizontal run of the conveyor one of the wheels 39 will traverse the upper track 31a and the other the lower track 31b, so that the frame is maintained in a generally horizontal position, while when the frame is traversing a vertical run of the conveyor both of the wheels 39 will traverse the single track, to again hold the frame in a generally horizontal position. In an alternative arrangement it may be possible to avoid the necessity for double tracks 31a and 31b along the horizontal runs of the conveyor, with double tracks engaged by both wheels 39 of each bogey being provided at the four corners of the conveyor run only. The upper wheel 39 of each bogey would engage a single track in the lower horizontal run of the conveyor and the lower wheel 39 of each bogey would engage a single track in the lower horizontal run, so that the conveyor system would be simplified.

The conditioning conveyor CC is positioned relative to the carousel C as is best apparent from FIGS. 1 and 2. The conditioning conveyor is provided with a drive motor (not shown in the drawings) controlled by a control system of the machine, and in operation of the machine moves in steps. A batch of loaves to be cooled is entered onto a rack mounted on a tray arm of the conditioning conveyor at point X in FIGS. 1 and 2 and is moved by the conditioning conveyor in steps along the bottom or forward run thereof and towards point Y. The stepped rotation of the carousel and stepped movement of the conditioning conveyor are co-ordinated such that as the rack of loaves approaches the carousel a carousel rack support station will approach the point Y. The conditioning conveyor will move the rack of loaves upwardly between the arms 7 (see FIG. 3) of the carousel station until the rack is engaged by the pawls 9 thereof as described, and the conditioning conveyor then moves a small amount in a reverse direction to leave the rack of loaves on the carousel with the then empty tray arm of the conditioning conveyor then below the carousel station. As the conditioning conveyor leaves the rack of loaves on the carousel station the needles thereof are caused to be inserted into the loaves, and the carousel is caused to move one 'step' to bring the next carousel station with a rack of loaves which has been subjected to cooling operations into alignment with the point Y. The conditioning conveyor is then caused to move forwardly so that the empty tray arm which has delivered the rack of hot loaves to be cooled now waiting below the carousel takes up the rack of cooled loaves from the carousel. The rack of loaves to be cooled on the following tray arm of the conditioning conveyor is then deposited as described above on the thus empty carousel station. As the conditioning conveyor and carousel move the process is repeated with racks of loaves to be cooled deposited one-by-one on adjacent stations of the carousel and racks of cooled loaves taken up from the carousel to the next station of the conditioning conveyor above the carousel and carrying on the return run of the conditioning conveyor to be transferred to the output conveyor as will be described.

While on the forward run of the conditioning conveyor the hot loaves which have exited the oven will tend to cool to an extent and lose moisture, and the flow of moisture from the interior of the loaves to the exterior softens the crusts thereof which is advantageous before the rapid cooling operations on the carousel are carried out. Similarly, on the return run of the conditioning conveyor from the carousel the temperature of the cooled loaves tends to equalise between the exterior of the loaves and the core, which is advantageous before the loaves are sliced and/or wrapped.

The preferred form apparatus includes input conveyor IC and batching conveyor BC for delivering batches of fixed numbers of loaves from a continuous stream of freshly baked loaves supplied from the oven depanning system onto the racks 8 of the conditioning conveyor. The input and batching conveyors IC and BC are indicated in FIGS. 1 and 2 as referred to earlier, and the input conveyor IC is shown in cross-section in FIG. 9, and a part of the transfer mechanism of the batching conveyor is shown in cross-section in FIG. 10 and the batching conveyor is shown in FIG. 11 and in schematic side view in FIGS. 12 and 13.

Figure 9:
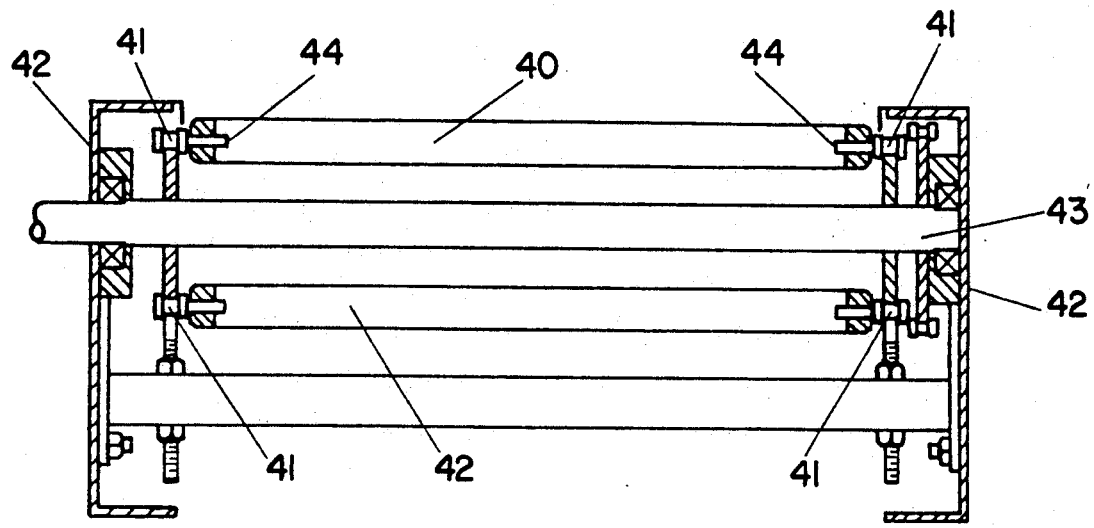
FIGS. 9 and 10 are cross-sectional views of the parts of the input and batching conveyors respectively along lines II—II and III—III of FIG. 11.

The input conveyor comprises a roller conveyor comprising a "belt" of a number of individual rollers 40 extending between continuous conveyor chains 41 on either side of longitudinally extending frame parts 42 of the batching conveyor. In FIG. 9 a driving shaft for the roller conveyor is indicated at 43. Each of the rollers 40 is carried on pins 44 provided on the conveyor chains 41 on either side, such that each of the rollers 40 may rotate on its pins about its longitudinal axis with only a slight degree of resistance to such rotation.

Figure 10:
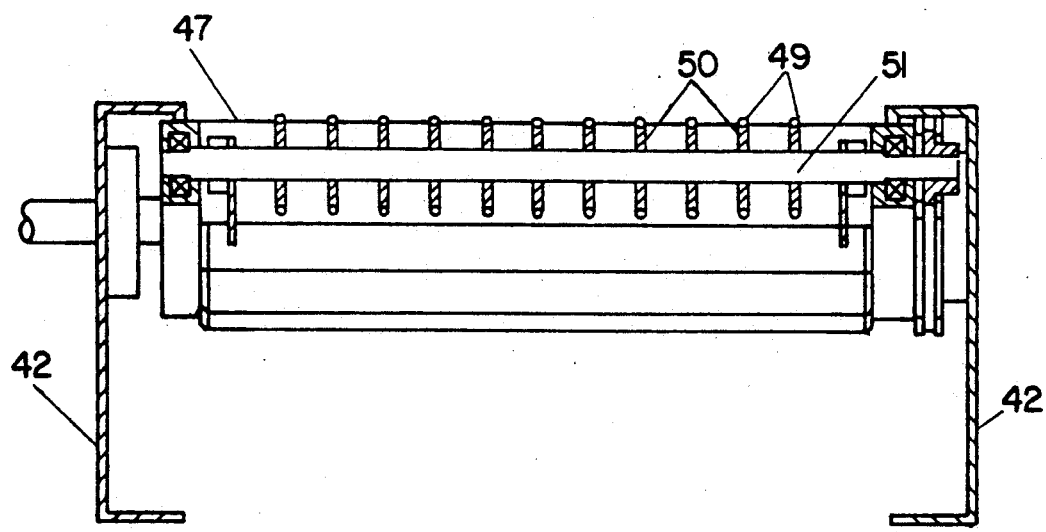
Figure 11:
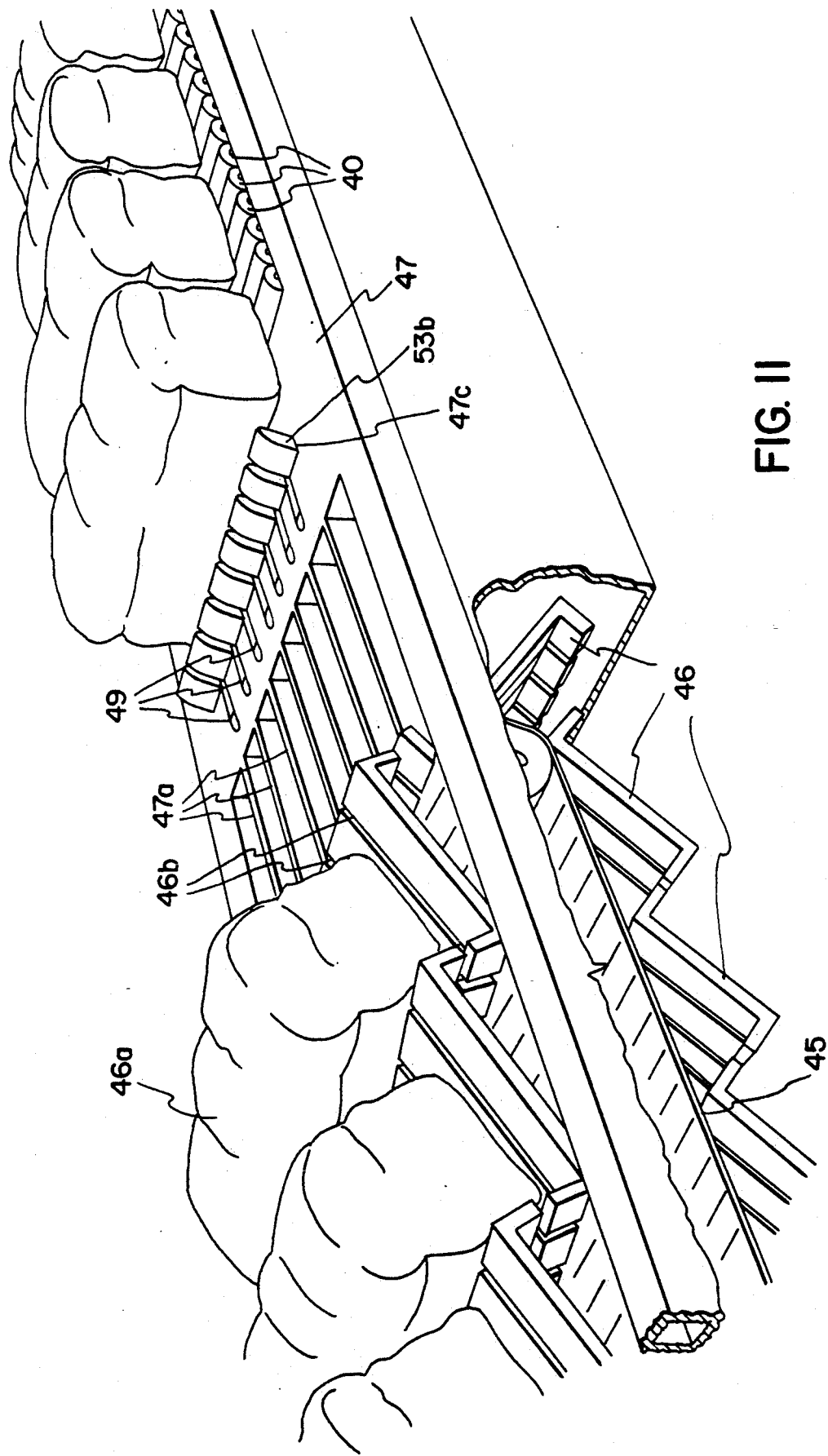
FIG. 11 is a three quarter view from above of the batching conveyor.
Figure 12:
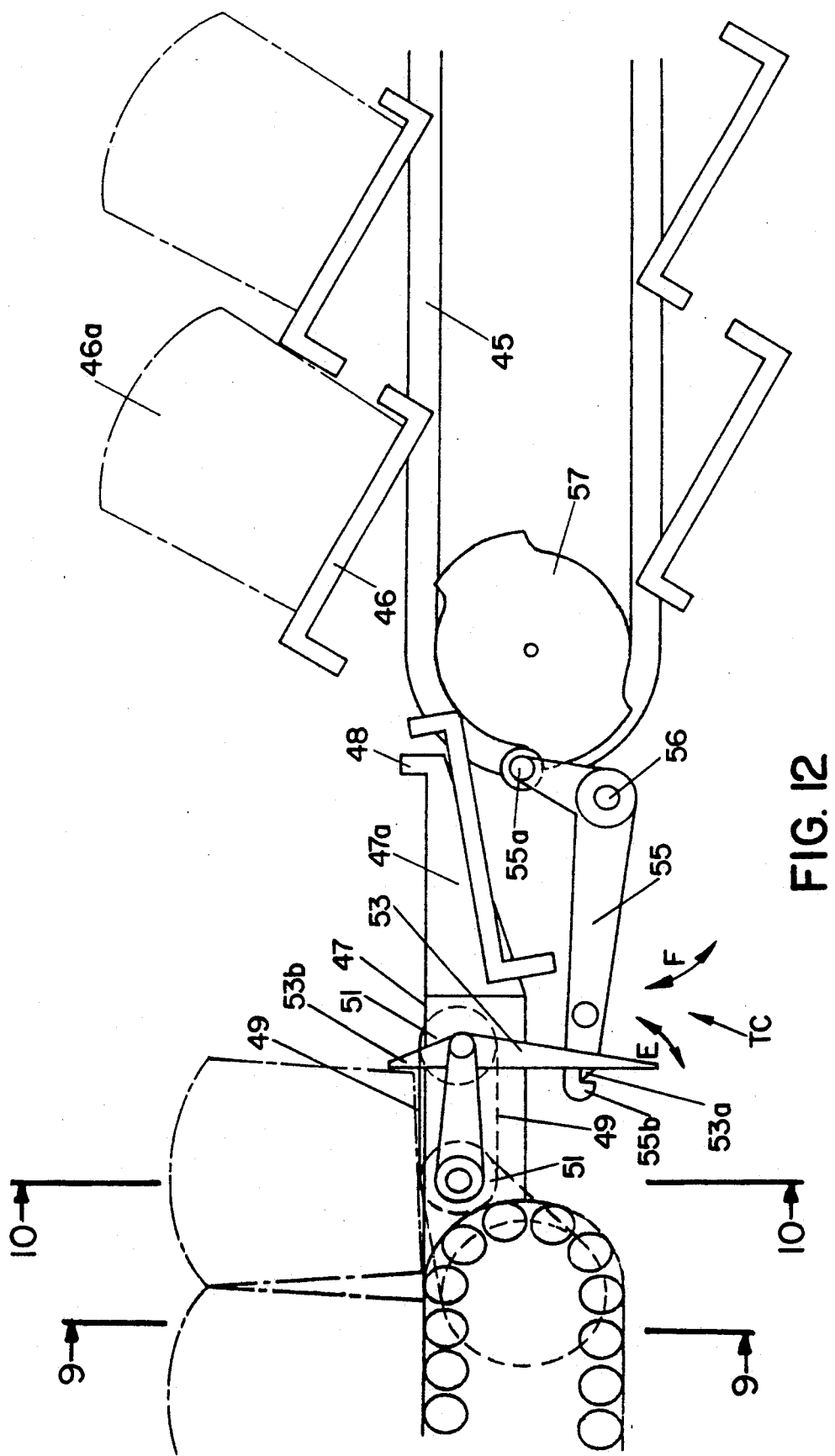
FIGS. 12 and 13 are side partially schematic views of a part of the batching conveyor.

The batching conveyor comprises a conveyor chain 45 supporting a plurality of angled trays 46 of a pressed metal construction and of a 'double L' shape in side view, generally as shown in FIGS. 10 to 12. Each of the trays 46 is so fixed to the conveyor chain 45 that when carrying a loaf on the forward run of the batching conveyor, such as that shown in FIG. 11 and in phantom outline in FIGS. 11 and 12, the loaf will be held at an angle as shown, and such that when moving from the return run around the end drive wheel (not shown) of the conveyor adjacent the forward end of the roller conveyor the trays 46 will be positioned such that the top thereof is generally horizontal as shown, in the position of tray 46b in FIG. 13.

A transfer mechanism part of the batching conveyor generally indicated at TC in FIGS. 11 to 1 is provided for transferring the individual loaves from the roller input conveyor each onto a tray 46 of the batching conveyor. The transfer mechanism includes an extension table 47 which extends from the end of the roller part of the conveyor towards the tray conveyor as shown, having a distal lip 48. The forward part 47a of the table is formed by a number of vertically aligned plates having side profiles as shown and spaced from each other, and the trays 46 include a number of corresponding slots, visible at 46b in FIG. 11. The arrangement is such that as the trays 46 pass the table 47 they in effect pass 'through' the forward part 47a thereof, the plates forming the table 'interleaving' through the slots 46b of each passing tray. A transfer belt comprising a number of individual bands 49 extending about shaft 51 comprising spaced wheel members 50 is mounted beneath the table 47 such that the top runs of the bands 49 forming in effect the transfer belt pass over the top surface of the table 47 between the two shafts 51. The transfer belt is caused in operation of the machine to rotate at high speed relative to the speed of the input and batching conveyors.

Figure 13:
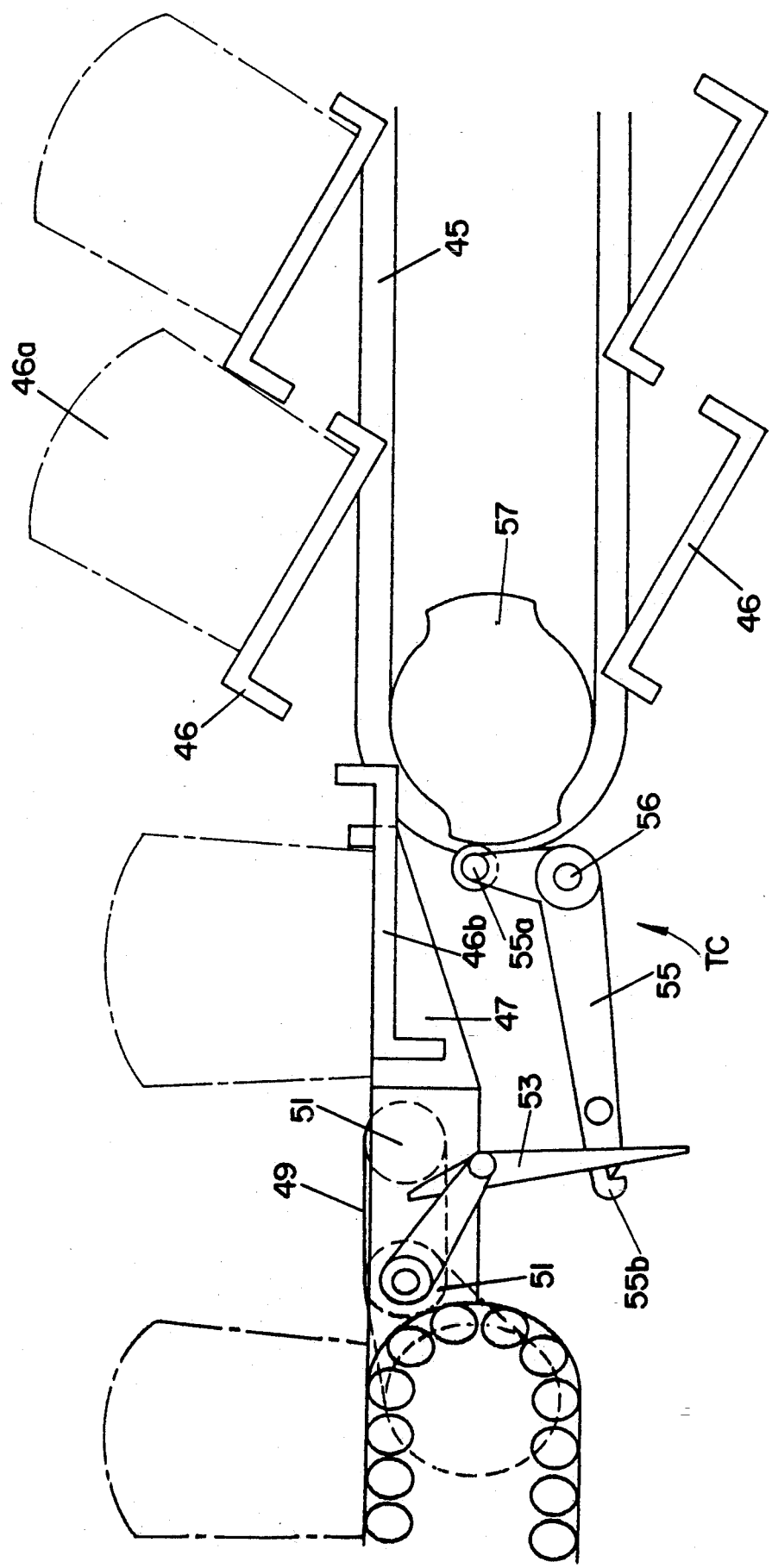

A gate member 53 which extends across the path of loaves on the input conveyor is mounted about the axis of the forward shaft 51 and has a top part 53b which extends upwardly through a transverse slot 47c in the table 47 (see FIG. 11), into the path of loaves moving onto the table from the roller part of the conveyor. The forward roller and gate member 53 are mounted about the axis of the rear roller 51 for pivotal movement about same in the direction of arrow E (FIGS. 12 and 13). A drop arm member 55 is also mounted beneath the table 47 for pivotal movement about an axis 56 as indicated by arrow F. One end 55a of the drop arm 55 engages a pair of rotating cams 57 provided one on either side of the end of the batching conveyor and shaped generally as shown while the other end 55b thereof normally latches the lower end of the gate member 52 and in particular the nib 53a thereon.

The arrangement is such that as each tray 46 of the tray conveyor moves towards the position of tray 46b in FIG. 13 to align with the table 47, the cam 57, which rotates in synchronisation with the tray conveyor, will cause the drop arm 55 to pivot from the position shown in FIG. 12 to the position shown in FIG. 13 drawing the gate member 53 downwards from the path of loaves and allowing the foremost loaf to move ahead. In operation a stream of loaves to be cooled (a number of loaves are shown in FIG. 11 and in phantom outline in FIGS. 12 and 13) is conveyed from an oven to the roller input conveyor IC. As each loaf in turn approaches the transfer mechanism TC it will contact the exposed top part 53b of the gate member 53, at that time unlatched from the drop arm 55, causing the gate to be tilted forward to the latched position shown in the drawings ready for the downward movement by the drop arm 55 and will stop against same. The loaves behind this foremost loaf will bank up against one another on the input conveyor. The roller input conveyor continues to move at a constant speed but the resistance against movement provided by the banking up of the loaves against the foremost loaf causes the individual rollers 40 beneath loaves which have stopped moving to roll along the bottom of the loaves about their longitudinal axes, on the pins 44; the resistance of the individual rollers against this longitudinal rotational movement is sufficient that when there is no barrier to the movement of the loaves along the roller conveyor the loaves will be conveyed towards the transfer mechanism TC but sufficiently low that when the foremost loaf contacts the fixed gate member and the loaves bank up as described, the individual rollers will roll below the loaves so that the banked up loaves remain stationary. As shown in FIG. 12 as a tray 46 of the batching conveyor moves towards the table 47 of the transfer mechanism, and to the position of tray 46b in FIG. 12, wherein the tray is level with the top of the table 47, the drop arm 55 will be caused to pivot by the action of the cam 56 synchronised with the tray conveyor as described, to draw down the gate mechanism which will pivot about axis the axis of the rear roller 51 until the gate member 53 is in the position shown in FIG. 13, enabling the foremost loaf to move forward. As the foremost loaf does so it will ride up onto the high speed transfer belt 49 which in turn causes the loaf to be moved or thrown forward onto the forward end of the table 47, against the distal lip 48. The arrangement is such that this is timed to occur as a tray 46 moves upwardly beneath the table 47 so that the tray will collect the loaf advanced by the transfer belt 49, and move it forward along the tray conveyor. The cam 57 is shaped such that as the tray 45 begins to move forward with the loaf the drop-arm member 55 and gate mechanism will then return to their original positions. These operations occur very quickly so that the gate member is back in position as the next loaf moves forward so that the process is repeated. The loaves moving along the roller conveyor are thus transferred each individually to a tray of the batching conveyor.

Figure 14:
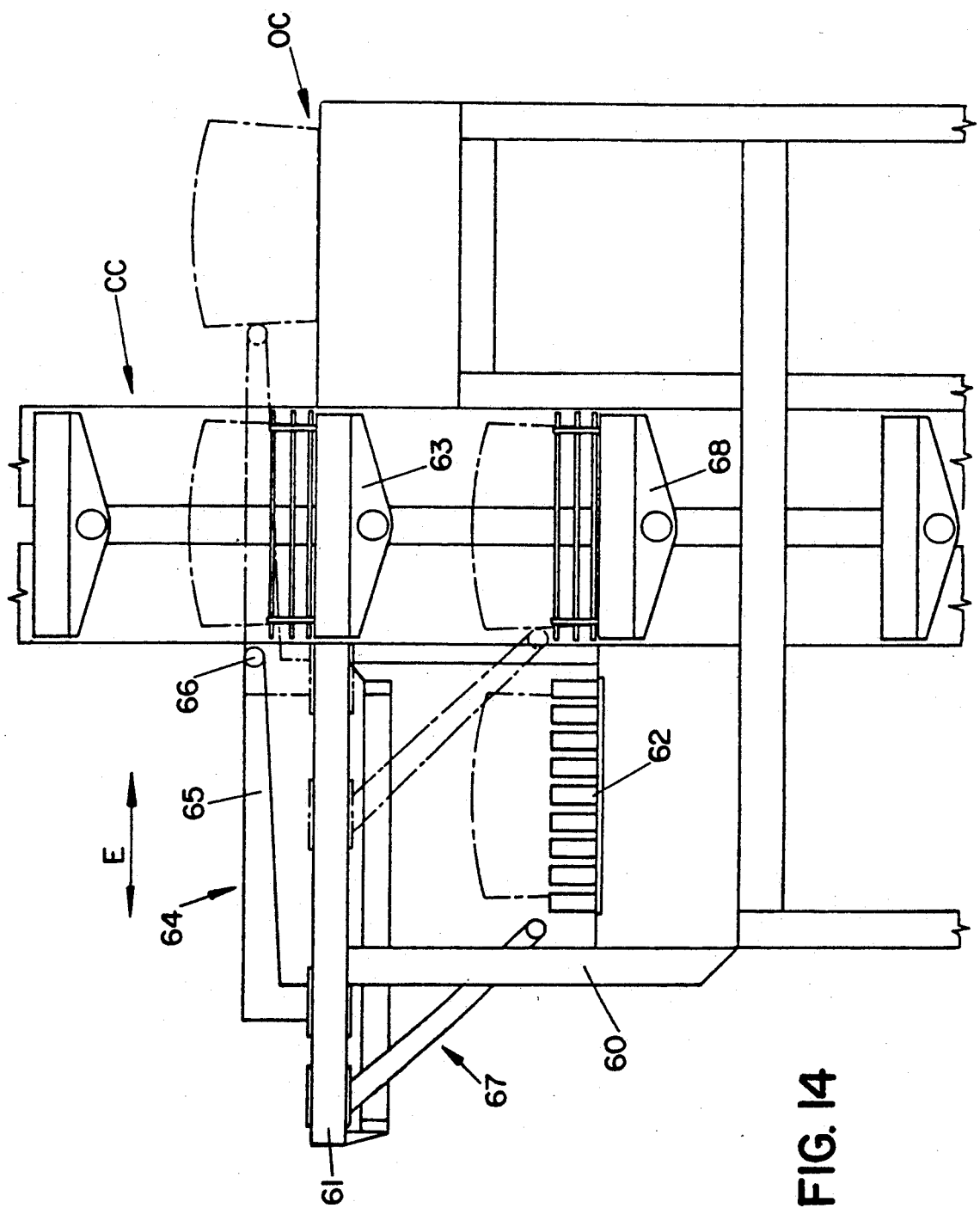
FIG. 14 is a view of the machine showing parts of the batching and conditioning conveyors and the pusher bar arrangements of the preferred form machine.

The batching conveyor moves the loaves towards a means for transferring batches of fixed numbers of loaves onto the racks carried by the conditioning conveyor as previously referred to, positioned generally at point X in FIGS. 1 and 2. In the preferred form machine an arrangement of pusher bar mechanisms is provided and the batching conveyor moves in steps as will be described. In FIG. 14 reference numeral 60 indicates a fixed part of the machine frame work past which passes a vertical part of the return run (through point X in FIG. 2) of the conditioning conveyor. The part of the machine shown in FIG. 14 is indicated by arrow F14 in FIG. 2. The conditioning conveyor is indicated at CC while the forward end of the batching conveyor, seen end-on in FIG. 14, is schematically indicated at 62. In its stepped movement the conditioning conveyor moves such that each tray arm carrying a rack of cooled loaves returning from the carousel is moved to the position of support frame/rack 63 in FIG. 14, between the output conveyor OC and an unload pusher bar arrangement generally indicated at 64. The pusher bar arrangement comprises a pusher bar frame 65 mounting at its forward end a pusher bar 66 extending generally horizontally and of a similar length to that of the loaf rack of the conditioning conveyor/carousel. The pusher bar frame 65 is slidably mounted on the part 61 of the machine frame for movement as indicated by arrows E from the position shown to that shown in phantom outline, and return, by way of a suitable linear bearing and track system with the pusher bars being operated by a rodless pneumatic cylinder for example. When each conditioning conveyor tray arm carrying a rack of cooled loaves stops adjacent the output conveyor, in the position of rack 63 in FIG. 14, the pusher bar is caused to operate to move to its position shown in phantom outline as it does so pushing the cooled loaves in a sliding movement, from the conditioning conveyor rack onto the output conveyor OC, by which they are then conveyed onwards to some further processing stage as referred to.

A similar load pusher bar arrangement 67 similarly mounted to the machine frame 61 for sliding movement from the position shown to that shown in phantom outline and return is provided for moving loaves to be cooled from the individual trays of the tray part of the batching conveyor to an empty rack of the conditioning conveyor, for conveying to the carousel. As the conditioning conveyor moves forward after cooled loaves have been moved from the conditioning conveyor to the output conveyor by the pusher bar 64 the thus emptied rack support position and rack thereon is moved to the postion occupied by that shown at 68 in FIG. 14. The batching conveyor steps forward until eight trays each carrying a loaf to be cooled are positioned opposite the empty rack 10 on the conditioning conveyor and the pusher bar 67 is then caused to move to slide the individual loaves from the trays onto the rack, the pusher bar then returning to its original position. Preferably the pusher bar is controlled by a suitable electronic sensor system such that the length of the stroke of the pusher bar is altered dependant on the loaf size and in particular the length of the loaves, so that the loaves will always be left generally in the middle of the rack on the conditioning conveyor. The conditioning conveyor is then caused to step on and further trays of the batching conveyor loaded with loaves by the transfer mechanism TC as described move forward until again eight loaves are positioned adjacent the conditioning conveyor, when a further empty conditioning conveyor rack which has despatched previously cooled loaves is positioned adjacent the tray conveyor and the pusher bar 67 again acts to load loaves to be cooled onto the rack. These operations are again carried out continuously and at relatively high speed. In the preferred form machine the input and output pusher bars move simultaneously and the output conveyor is controlled to move in a synchronised action with the batching conveyor. The output conveyor passes the cooled loaves through a metal detector 70 (see FIG. 2), primarily for raising an alarm in the event that a needle has broken and is embedded in one of the loaves.

It is important for the cooling air passing through the loaves during the cooling operations to be suitably conditioned prior to use. The air should be substantially 100% pure so that impurities are not introduced into the loaves and the air should be at a suitable temperature, pressure, and moisture content. The pressure of the air going into the system should take into account that a pressure drop occurs as the air exits the needles into the loaves. Typically the air is passed through a suitable conditioning system including filtration, temperature adjustment and moisturising stages, after pressurization.

The preferred embodiment machine described above and illustrated in the drawings is described by way of example. The carousel which in the preferred embodiment comprises a generally horizontally mounted carousel as described could alternatively comprise some form of endless conveyor or the like for example. The single conditioning conveyor of the preferred embodiment which acts both to deliver batches of loaves to be cooled to the carousel and uplift same after cooling operations could comprise separate conveyors, and the loaves could be delivered to the carousel or equivalent individually rather than in batches. Mechanical mechanisms other than those described may be utilised. The preferred form machine as described comprises a single carousel but in other arrangements a machine of the invention could comprise two carousels in tandem, or more, with one or more conditioning conveyors, as will be apparent to those skilled in the art.

The foregoing describes the invention including a preferred form thereof by way of example and such alterations and modifications as will be obvious to those skilled in the art are intended to be incorporated within the scope hereof, as defined in the claims.

What is claimed is:

1. A bread cooling machine comprising:
   at least one carousel mounted for rotation about a central axis and comprising a number of stations about the periphery of the carousel each arranged to support one or more batches of loaves under ambient atmospheric conditions at the exterior of the loaves, wherein the loaves are subject to cooling operations during rotation of the carousel,
   means for carrying out cooling operations on the loaves at each carousel station comprising hollow needle means for penetrating the interior of the loaves and for supplying air under pressure thereto, wherein the hollow needle means for penetrating and supplying causes a flow of cooling air from the interior of the loaves to the ambient atmospheric conditions at the exterior of the loaves,
   batching means for delivering batches of a fixed number of loaves to be cooled from a continuous stream of loaves for transfer to the carousel stations, and
   conveyor means for sequentially delivering each of the batches of a fixed number of loaves to be cooled from the batching means to the carousel stations and for sequentially receiving from the carousel stations the batches of a fixed number of loaves after the cooling operations take place.

2. A bread cooling machine as claimed in claim 1, wherein as each carousel station passes the conveyor means a batch of loaves previously subjected to cooling operations is transferred from the carousel station to the conveyor means and a batch of loaves to be cooled is transferred from the conveyor means to the carousel station.

3. A bread cooling machine as claimed in claim 2, wherein the loaves are supported at each carousel station on a rack and wherein the batching means is arranged to place each of the batches of a fixed number of loaves to be cooled onto the rack and to provide the racks for delivery to the conveyor means for transfer to the carousel.

4. A bread cooling machine as claimed in claim 4, wherein the carousel rotates with a stepped rotational movement and the conveyor means moves with a similar stepped rotational movement in synchronization with the carousel, wherein as each rack of loaves to be cooled is carried by the conveyor means and approaches a conveyor means carousel transfer location, the rack of loaves to be cooled is transferred while the carousel is stationary to a station of the carousel, and as each rack of cooled loaves on the carousel approaches a second carousels conveyor means transfer location it is transferred while the carousel is stationary to the conveyor means.

5. A bread cooling machine as claimed in claim 4, wherein the conveyor means further comprises a single continuous conveyor having a forward run which carries the batches of loaves to be cooled from the batching means to the carousel and a return run which carries the batches of cooled loaves from the carousel.

6. A bread cooling machine as claimed in claim 5, wherein the transfer of the cooled loaves from the carousel stations to the conveyor means and the transfer of the loaves to be cooled from the conveyor means to the carousel occurs at the same transfer location and wherein the conveyor means acts to deposit a rack of loaves to be cooled at a carousel station between steps in the rotational movement of the carousel, and then after a step in movement of the carousel lifts a rack of cooled loaves from a successive carousel station before depositing a subsequent rack of loaves to be cooled on the carousel station.

7. A bread cooling machine as claimed in claim 6 wherein the conveyor means deposits racks of loaves to be cooled at the carousel stations by passing said rack of loaves upwardly between spaced arms of the carousel at the carousel station during a forward movement of the conveyor until means for latching located between said arms and the rack on either side engages and supports the rack at the carousel station and wherein after the latching means engages, a reverse movement of the conveyor means causes disengagement of the conveyor means from the rack and wherein the conveyor means uplifts racks of cooled loaves from the carousel stations by passing upwardly beneath the rack to disengage the rack from said batching means.

8. A bread cooling machine as claimed in claim 4 wherein the needle means are moveable and synchronized to a stepped rotational operation of the carousel and the conveyor means, wherein the needle means moves between a first position where the needle means is fully inserted into the loaves carried at the carousel station, and a second position where the needle means are fully withdrawn from the loaves enabling placement and removal of the loaves from the carousel station.

9. A bread cooling machine as claimed in claim 8, wherein the machine is arranged to support and carry out cooling operations on a plurality of loaves at each carousel station simultaneously, and wherein there are a plurality of needle means at each carousel station.

10. A bread cooling machine as claimed in claim 9 wherein means for actuating the insertion and withdrawal movement of the needle means is provided at said transfer location and said means for actuating is arranged to engage at least one needle means support frame of each carousel station when the support frame is at said transfer location causing entry and withdrawal of the needle means.

11. A bread cooling machine as claimed in claim 1 wherein air under pressure is supplied to the needle means at each carousel station from a central source through a rotating union at a carousel axis of rotation, said rotating union comprising a fixed stator and a moving rotor having ports through which air is communicated to the needle means at each carousel station.

12. A bread cooling machine as claimed in claim 8, wherein air under pressure is supplied to the needle means at each carousel station from a central source through a rotating union at a carousel axis of rotation, said rotating union comprising a fixed stator and a moving rotor including ports through which air is communicated to the needle means at each carousel station.

13. A bread cooling machine as claimed in claim 1, comprising a plurality of said carousels.

* * * * *